United States Patent
Mehta et al.

(10) Patent No.: US 9,509,746 B2
(45) Date of Patent: Nov. 29, 2016

(54) PROVISIONING REMOTE ACCESS POINTS

(71) Applicant: Aruba Networks, Inc., Sunnyvale, CA (US)

(72) Inventors: Manish Mehta, Santa Clara, CA (US); Shekhar Kshirsagar, San Jose, CA (US); Santashil PalChaudhuri, West Bengal (IN)

(73) Assignee: Aruba Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/084,325

(22) Filed: Nov. 19, 2013

(65) Prior Publication Data

US 2014/0082060 A1    Mar. 20, 2014

Related U.S. Application Data

(63) Continuation of application No. 12/477,774, filed on Jun. 3, 2009, now abandoned.

(51) Int. Cl.
| | |
|---|---|
| *G06F 15/16* | (2006.01) |
| *H04L 29/08* | (2006.01) |
| *H04L 29/06* | (2006.01) |
| *H04W 24/02* | (2009.01) |

(Continued)

(52) U.S. Cl.
CPC ........... *H04L 67/02* (2013.01); *H04L 63/0823* (2013.01); *H04W 24/02* (2013.01); *H04L 63/101* (2013.01); *H04W 84/045* (2013.01); *H04W 88/085* (2013.01)

(58) Field of Classification Search
CPC . H04L 67/02; H04L 63/101; H04L 63/0823; H04W 24/02; H04W 84/045; H04W 88/085

USPC ................ 709/203, 220, 238, 201, 202, 204
See application file for complete search history.

(56) References Cited

U.S. PATENT DOCUMENTS

| | | | | |
|---|---|---|---|---|
| 7,249,177 B1 * | 7/2007 | Miller | ..................... | G06F 21/32 709/203 |
| 7,292,592 B2 * | 11/2007 | Rune | ............................ | 370/401 |
| 7,805,161 B1 * | 9/2010 | Jones | ..................... | H04W 8/02 455/435.1 |

(Continued)

OTHER PUBLICATIONS

Droms, R., "Dynamic Host Configuration Protocol", Network Working Group Request for Comments: 2131, Obsoletes: 1541, Category: Standards Track, Mar. 1997, pp. 1-45.

(Continued)

*Primary Examiner* — Thu Ha Nguyen
(74) *Attorney, Agent, or Firm* — Mannava & Kang, P.C.

(57) ABSTRACT

Provisioning remote access points for use in a telecommunication network. A remote access point contains identity information established during manufacturing; this identity information may be in the nature of a digital certificate. The identity information is stored in the remote access point, and may be stored in a Trusted Platform Module if present. When the remote access node is powered up in unprovisioned state, outside the manufacturing environment, it attempts to establish an internet connection via a first wired interface, and queries a user for information representing the TCP/IP address of its controller via a second wired interface. Once an internet connection is present, and a TCP/IP address has been provided, the remote access point attempts to connect to the controller at that address. Once a connection is established, controller and access point exchange and verify each other's identities.

15 Claims, 2 Drawing Sheets

(51) Int. Cl.
*H04W 84/04* (2009.01)
*H04W 88/08* (2009.01)

(56) References Cited

U.S. PATENT DOCUMENTS

| | | | |
|---|---|---|---|
| 7,890,612 B2 * | 2/2011 | Todd et al. | 709/220 |
| 8,683,075 B1 * | 3/2014 | Joffe et al. | 709/238 |
| 9,219,719 B1 * | 12/2015 | Jagpal | H04L 63/062 |
| 2002/0026503 A1 * | 2/2002 | Bendinelli | H04L 12/2602 |
| | | | 709/220 |
| 2003/0043178 A1 * | 3/2003 | Gusler et al. | 345/705 |
| 2003/0043180 A1 * | 3/2003 | Gusler et al. | 345/708 |
| 2003/0046410 A1 * | 3/2003 | Gusler et al. | 709/229 |
| 2003/0169713 A1 * | 9/2003 | Luo | 370/338 |
| 2003/0237016 A1 * | 12/2003 | Johnson et al. | 714/4 |
| 2004/0268148 A1 * | 12/2004 | Karjala et al. | 713/201 |
| 2005/0086295 A1 * | 4/2005 | Cunningham et al. | 709/203 |
| 2006/0045267 A1 * | 3/2006 | Moore | H04L 63/061 |
| | | | 380/247 |
| 2006/0077926 A1 * | 4/2006 | Rune | 370/328 |
| 2006/0185001 A1 * | 8/2006 | Stieglitz et al. | 726/4 |
| 2007/0081477 A1 * | 4/2007 | Jakkahalli | H04L 12/4645 |
| | | | 370/310 |
| 2008/0098472 A1 * | 4/2008 | Enomoto et al. | 726/12 |
| 2009/0094351 A1 * | 4/2009 | Gupta et al. | 709/220 |
| 2009/0131050 A1 * | 5/2009 | Osborn | H04W 76/022 |
| | | | 455/435.1 |
| 2009/0327116 A1 * | 12/2009 | Cunningham et al. | 705/37 |
| 2010/0293590 A1 * | 11/2010 | Dandabany | 726/1 |
| 2011/0078443 A1 * | 3/2011 | Greenstein et al. | 713/169 |
| 2011/0087882 A1 * | 4/2011 | Kuo et al. | 713/156 |
| 2011/0258454 A1 * | 10/2011 | Qiu et al. | 713/176 |
| 2012/0023569 A1 * | 1/2012 | Spicer et al. | 726/12 |
| 2012/0036234 A1 * | 2/2012 | Staats et al. | 709/220 |
| 2013/0007506 A1 * | 1/2013 | Jain et al. | 714/4.12 |
| 2013/0024921 A1 * | 1/2013 | Gupta et al. | 726/6 |
| 2014/0068030 A1 * | 3/2014 | Chambers | H04L 41/0809 |
| | | | 709/220 |
| 2014/0173061 A1 * | 6/2014 | Lipstone | H04L 67/289 |
| | | | 709/220 |
| 2016/0088021 A1 * | 3/2016 | Jayanti Venkata | G06F 8/60 |
| | | | 726/1 |

OTHER PUBLICATIONS

Housley, R., "Using Advanced Encryption Standard (AES) CCM Mode with IPsec Encapsulating Security Payload (ESP)", Network Working Group Request for Comments: 4309, Category: Standards Track, Dec. 2005, pp. 1-13.

Kent et al., "Security Architecture for the Internet Protocol", Network Working Group Request for Comments: 4301, Obsoletes: 2401, Category: Standards Track, Dec. 2005, pp. 1-101.

* cited by examiner

PROVISIONING REMOTE ACCESS POINTS

BENEFIT CLAIM; INCORPORATION BY REFERENCE; RELATED CASES

This application claims benefit as a Continuation of application Ser. No. 12/477,774 filed on Jun. 3, 2009, the content of which is hereby incorporated by reference.

The applicant(s) hereby rescind any disclaimer of claim scope in the parent application(s) or the prosecution history thereof and advice the USPTO that the claims in this application may be broader than any claim in the parent application(s).

BACKGROUND OF THE INVENTION

The present invention relates to telecommunication networks, and in particular, to the problem of setting up (provisioning) remote access points for use in telecommunication networks.

Remote networking allows the extension of a networking environment, such as a corporate networking environment, to remote locations. In operation, a remote access point at a remote location establishes a connection with its home (corporate) controller over the switched internet. In most cases this connection is an encrypted tunnel. The remote access point, connected to the home controller, extends the services available in the corporate environment through wireless and/or wired connections with the remote access point. This allows corporate users full access to systems and services in remote locations, such as remote offices or homes. It also allows corporate information technology groups to provide such access in a controlled and secure manner.

An issue with remote access points, and in particular to deploying remote access points to a large number of users and/or locations is the time and labor required. Each remote access point must be properly set up, or provisioned. Typically this requires an information technology specialist in the organization to take a remote access point out of its packaging, install required configuration information such as the IP address of the corporate controller the remote access point is to contact, device credentials, and any updates necessary. Then the remote access point is repackaged and sent to the particular user or location for installation and use. Of course the remote access point must be tracked through all these steps.

While such provisioning may be acceptable for a small number of units, such a process does not scale, becoming burdensome when more than a few units are involved.

What is needed is a better way to provision remote access points.

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate to methods of provisioning remote access points.

An access point has identification information stored in it as part of the manufacturing process. This identification information may include digital certificates which are cryptographically signed, and keys corresponding to these certificates may be stored in a Trusted Platform Module (TPM) if available in the remote access point. The identification information contains information about the particular remote access point, and may include information such as Media Access Control (MAC) addresses for wired and/or wireless ports. The remote access point also contains a program to be run at power up if the access point is in an unprovisioned state.

When an unprovisioned remote access point is powered up by a user it establishes an internet connection using a first wired port. On a second wired port, the remote access point requests user input relating to the TCP/IP address or fully qualified domain name of the controller which is to support the remote access point. The remote access point uses this user input to establish a connection to the controller via the internet connection using the first wired port. This connection between the remote access point and the controller may be via a tunnel, which may be encrypted or secured. Optionally, the controller may have a list of remote access points it is to support, and accept connections from and send configuration information to only those remote access points. Once connected, the remote access point and the controller exchange identification information to verify identities. Once verified, the controller sends configuration data and any updates to the remote access point. The remote access point installs this configuration information to provision the remote access point, and places it into operation. This may require rebooting the remote access point.

Figure 1:
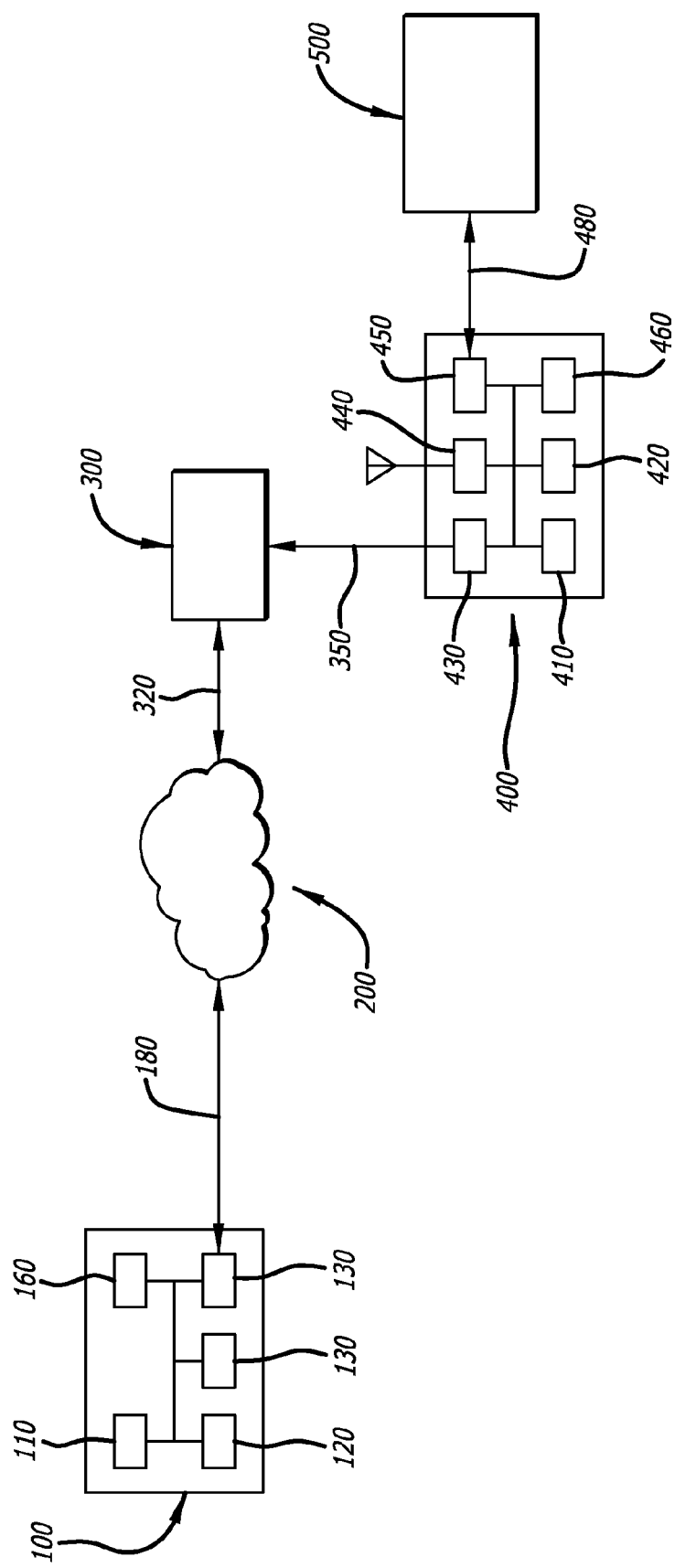
FIG. 1 shows a network.

FIG. 1 shows a network. Router 100 connects 180 to a switched network 200 such as the Internet. At a remote location, interface 300 also connects 320 to network 200 providing connectivity 350. Interface 300 may be a device known to the art such as a DSL or Cable modem, or a wireless interface such as a 3G, WiMAX, WiFi, or other radio connection. Interface 300 provides services such as Internet access via wired connection 350, which may be in the form of an IEEE802.3 Ethernet interface, or another wired interface such as USB or IEEE1394 Firewire. Remote access point 400 connects 350 to the Internet via first wired interface 430.

Controller 100 is a purpose-built digital device having a CPU 110, memory hierarchy 120, and a plurality of network interfaces 130. CPU 110 may be a MIPS-class processor from companies such as Raza Microelectronics or Cavium Networks, although CPUs from companies such as Intel, AMD, IBM, Freescale, or the like may also be used. Memory hierarchy 120 includes read-only memory for device startup and initialization, high-speed read-write memory such as DRAM for containing programs and data during operation, and bulk memory such as hard disk or compact flash for permanent file storage of programs and data. Network interfaces 130 are typically IEEE 802.3 Ethernet interfaces to copper, although high-speed optical fiber interfaces may also be used. Controller 100 typically operates under the control of purpose-built embedded software, typically running under a Linux operating system, or an operating system for embedded devices such as VXWorks. Controller 100 may have dedicated hardware for encryption, and/or for routing packets between network interfaces 130. Controller 100 may also be equipped with Trusted Platform Module (TPM) 160, an industry-standard device for providing secure storage.

Remote access point 400 is also a purpose-built digital device having a CPU 410, memory hierarchy 420, a first wired interface 430, an optional wireless interface 440, second wired interface 450 which may represent a plurality of additional wired interfaces, and may contain TPM 460 for secure storage. As with controller 100, the CPU commonly used for such access nodes is a MIPS-class CPU such as one from Raza Microelectronics or Cavium Networks, although processors from other vendors such as Intel, AMD, Freescale, and IBM may be used. Memory hierarchy 420 comprises read-only storage such as ROM or EEPROM for device startup and initialization, fast read-write storage such as DRAM for holding operating programs and data, and permanent bulk file storage such as compact flash memory. Remote access point 400 typically operates under control of purpose-built programs running on an embedded operating system such as Linux or VXWorks. Optional wireless interface 340 is typically an interface operating to the family of IEEE 802.11 standards including but not limited to 802.11a, b, g, and/or n. First wired interface 430 may be an IEEE803.2 Ethernet interface, or other wired interface such as USB or IEEE1394 Firewire. Similarly, second wired interface 450 may be one or more IEEE802.3 Ethernet interfaces, USB interfaces, IEEE1493 Firewire interfaces, or a combination. As an example, a small remote access point 400 may have an IEEE803.2 Ethernet wired interface for first wired interface 430, an IEEE802.11a/b/g/n wireless interface 440, and an additional IEEE802.3 Ethernet port and a USB port as second wired interface 450. A larger remote access point 400 may have multiple second Ethernet ports.

According to an aspect of the invention, during manufacturing, identification information is generated and stored in remote access point 400. This information may be stored in memory hierarchy 420, as an example in EEPROM or flash storage, and/or in TPM 460 if a TPM is present. This identification information contains device unique information, which may be for example a serial number, or the MAC address of the first wired interface 430.

In one embodiment of the invention, this information is stored as a digital certificate containing a Distinguished Name which contains the MAC address of the first wired interface 430 of the device. If remote access point 400 contains a TPM 460, the key for this certificate is stored in the TPM, otherwise the key for the certificate is stored in EEPROM or Flash memory.

Remote access point 400 also contains an initialization program stored in memory hierarchy 420 which is to be run whenever the remote access point 400 is powered up in unprovisioned state.

According to the invention, the user of remote access point 400 prepares it for setup by establishing a wired connection 350 between internet interface 300 and first wired interface 430. A second wired connection 480 is established between second wired interface 450 and a personal computer 500.

Figure 2:
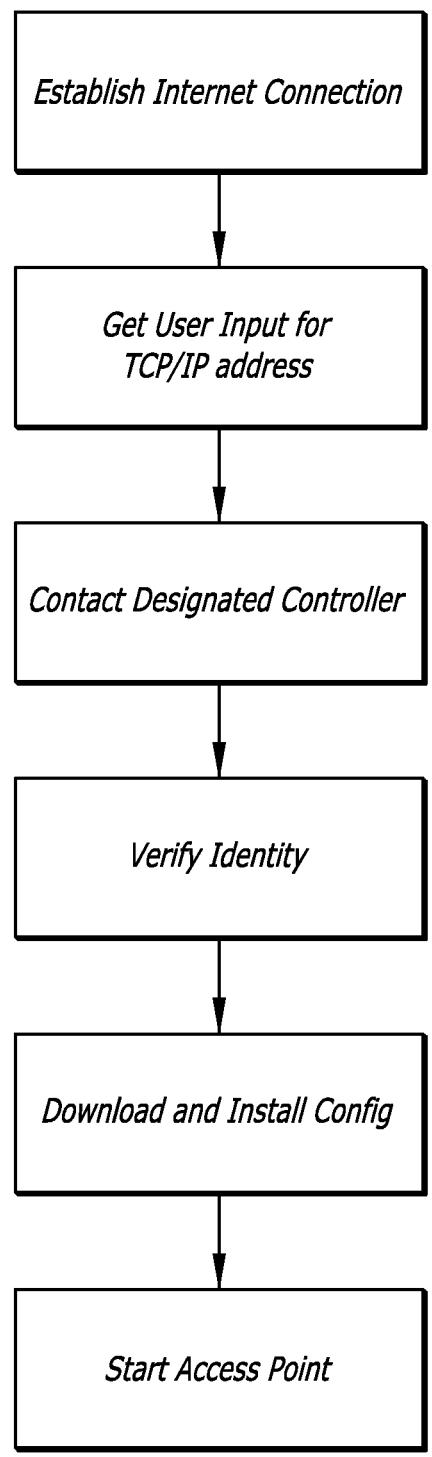
FIG. 2 shows device provisioning.

When remote access point 400 is powered up in an unprovisioned state, the initialization program executes as shown in FIG. 2. It first attempts to establish an Internet connection via first wired interface 430. The exact process required for establishing this connection depends on the nature of the interface, but is understood in the art. As an example, for Internet Protocol (IP) interfaces, the DHCP protocol described in RFC 2131 for IPv4 networks and RFC 3315 for IPv6 networks is used by the device to obtain the information necessary to establish an Internet connection.

The user is queried via second wired interface 450 and connection 480 to computer 500 for information on controller 100 which is to support remote access point 400.

In one embodiment of the invention, remote access point 400 starts up a simple web server attached to second wired interface 450. This allows the user to use any web browser on computer 500, such as Mozilla Firefox, Apple's Safari, Google's Chrome, or even Internet Explorer, to provide the needed information. This simple web server running on remote access point 400 provides a page in response to any URI requested from computer 500, requesting information on the controller which is to support remote access point 400. In one example, the information requested may be as simple as the TCP/IP address of controller 100, for example, an address such as 192.168.249.240 may be provided by the user. Rather than providing a TCP/IP address, the user may provide a fully qualified domain name (FQDN), such as setup.yoyodyne.com, which will be looked up by the initialization program and translated to a TCP/IP address. In another example, the user may be provided with a key code which is resolved to the TCP/IP address of the controller, such as XP3Y-4GG7-3DEK-6RTM which is resolved by the web server software running on remote access point 400 to the TCP/IP address needed.

In another embodiment of the invention, a simple serial protocol and interface may be used on second wired interface 450, such as an RS-232 serial interface, or RS-232 over USB, and a simple query and response scheme prompting the user for input and accepting that input, once again, the TCP/IP address of controller 100, a FQDN, or a key code which is resolved to the TCP/IP address of the controller.

Once the TCP/IP address of controller 100 has been provided, and the Internet connection established, remote access point 400 attempts to contact controller 100 at the specified TCP/IP address using wired interface 430.

Assume controller 100 is accessible via the Internet at the specified TCP/IP address. Controller 100 may accept requests from all remote access points contacting it at this address, or controller 100 may contain a whitelist stored in memory hierarchy 120 of those individual remote access points which are to be accepted. This whitelist may also reside outside of the controller 100 with the controller 100 being able to access the information at any time. This whitelist for example could be based on the unique MAC address of first wired interface 430 present in each remote access point 400. If the MAC address, which is present in the device credentials such as digital certificate, is on the whitelist, the connection is accepted, otherwise the connection is rejected.

If controller 100 accepts the connection from remote access point 400, controller 100 and remote access point 400 exchange and verify identity information. In one embodiment of the invention, this involves verifying certificates and certificate chain kept by each party.

Once identities have been verified, controller 100 sends configuration information to remote access point 400. In one embodiment of the invention, once the identities of controller 100 and remote access point 400 have been verified, a secure tunnel such as an IPsec tunnel is established between controller 100 and remote access point 400, and configuration information is downloaded through this tunnel. IPsec protocols are known to the art and are defined for example in RFC 4301, and RFC 4309.

The configuration information provided by controller 100 is installed in remote access point 400.

Optionally, a check for updates to the software present in remote access point 400 may be made with controller 100, and any additional or updated software downloaded and installed in remote access point 400. This may be performed, for example, by a system where controller 100 queries remote access point 400 for information on versions of installed software, compares those versions to current versions maintained on the controller, and sends updates as needed.

With the configuration information now present, initialization is complete, and operation of the remote access point in its provisioned state many now begin. This may be accomplished by the initialization program starting the remote access point software, or by the initialization software restarting remote access point 400.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. A computer implemented method, comprising:
establishing, at a network device, a wired network connection;
generating a query requesting controller information, wherein generating includes receiving a request for a web page and transmitting a query web page that is different from the requested web page, and wherein the query web page requests the controller information;
receiving input corresponding to a determination of the controller information;
transmitting a controller connection request using the controller information, wherein the controller connection request is transmitted using the wired network connection, wherein the controller connection request includes an identifier of the network device, wherein receiving the controller connection request at a network controller causes the network controller to query a whitelist for the identifier of the network device, and wherein the identifier of the network device is stored as a digital certificate;
receiving a response to the controller connection request;
establishing a controller connection using the response;
receiving configuration information over the controller connection; and
installing the configuration information.

2. The method of claim 1, wherein a key for the digital certificate is stored in a Trusted Platform Module (TPM) of the network device.

3. The method of claim 1, wherein establishing the controller connection includes establishing a secure tunnel between the network device and a network controller, and wherein receiving the configuration information includes receiving the configuration information over the secure tunnel.

4. The method of claim 1, further comprising:
receiving a query for installed software version information;
transmitting the installed software version information;
receiving updated software; and
installing the updated software.

5. The method of claim 1, wherein the network device is a wireless access point compliant with an IEEE 802.11 standard.

6. A system comprising:
one or more processors; and
a non-transitory computer readable storage medium communicatively coupled to the one or more processors, wherein the non-transitory computer readable storage medium includes instructions that, when executed by the one or more processors, cause the one or more processors to perform operations including:
establishing a wired network connection;
generating a query requesting controller information, wherein generating includes receiving a request for a web page and transmitting a query web page that is different from the requested web page, and wherein the query web page requests the controller information;
receiving input corresponding to a determination of the controller information;
transmitting a controller connection request using the controller information, wherein the controller connection request is transmitted using the wired network connection, wherein the controller connection request includes an identifier of the system, wherein receiving the controller connection request at a network controller causes the network controller to query a whitelist for the identifier of the system, and wherein the identifier of the system is stored as a digital certificate;
receiving a response to the controller connection request;
establishing a controller connection using the response;
receiving configuration information over the controller connection; and
installing the configuration information.

7. The system of claim 6, further comprising:
a Trusted Platform Module (TPM) communicatively coupled to the one or more processors, wherein a key for the digital certificate is stored in the TPM.

8. The system of claim 6, wherein establishing the controller connection includes establishing a secure tunnel between the system and a network controller, and wherein receiving the configuration information includes receiving the configuration information over the secure tunnel.

9. The system of claim 6, wherein the operations further include:
receiving a query for installed software version information;
transmitting the installed software version information;
receiving updated software; and
installing the updated software.

10. The system of claim 6, wherein the system is a wireless access point compliant with an IEEE 802.11 standard.

11. A non-transitory computer readable medium comprising instructions that, when executed by one or more processors, cause the one or more processors to perform operations including:
establishing, at a network device, a wired network connection;
generating a query requesting controller information, wherein generating includes receiving a request for a web page and transmitting a query web page that is different from the requested web page, and wherein the query web page requests the controller information;
receiving input corresponding to a determination of the controller information;
transmitting a controller connection request using the controller information, wherein the controller connection request is transmitted using the wired network connection, wherein the controller connection request includes an identifier of the network device, wherein receiving the controller connection request at a network controller causes the network controller to query a whitelist for the identifier of the network device, and wherein the identifier of the network device is stored as a digital certificate;

receiving a response to the controller connection request;

establishing a controller connection using the response;

receiving configuration information over the controller connection; and installing the configuration information.

12. The non-transitory computer readable medium of claim 11, wherein a key for the digital certificate is stored in a Trusted Platform Module (TPM) of the network device.

13. The non-transitory computer readable medium of claim 11, wherein establishing the controller connection includes establishing a secure tunnel between the network device and a network controller, and wherein receiving the configuration information includes receiving the configuration information over the secure tunnel.

14. The non-transitory computer readable medium of claim 11, further comprising instructions that, when executed by the one or more processors, cause the one or more processors to perform operations including:

receiving a query for installed software version information;

transmitting the installed software version information;

receiving updated software; and installing the updated software.

15. The non-transitory computer readable medium of claim 11, wherein the network device is a wireless access point compliant with an IEEE 802.11 standard.

* * * * *